United States Patent Office 3,344,451
Patented Oct. 3, 1967

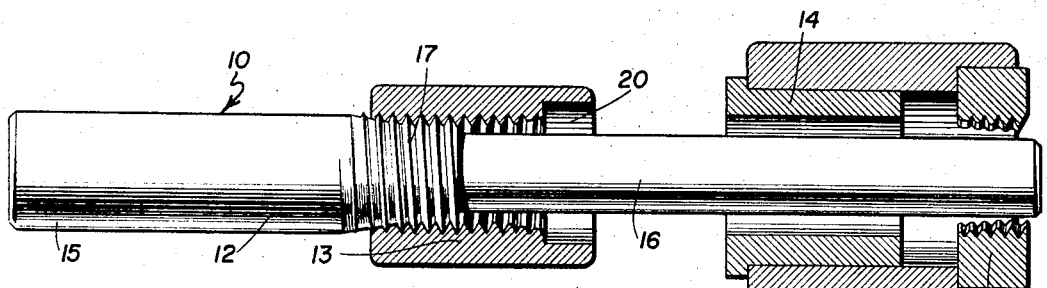
FIG. 1
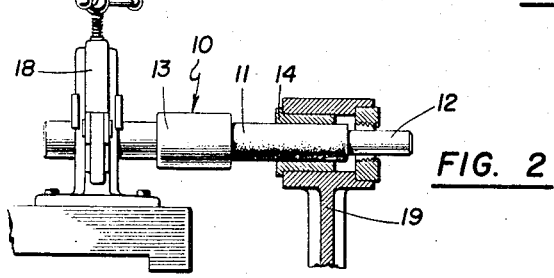
FIG. 2
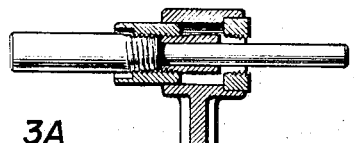
FIG. 3A
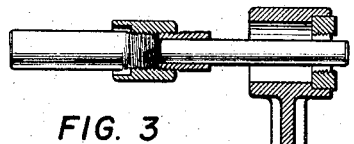
FIG. 3
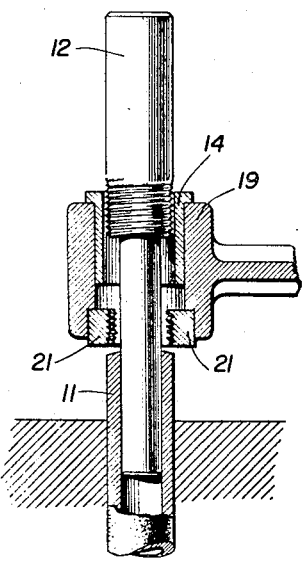
FIG. 5
| PIPE LENGTH | MANDREL | SLEEVE | BUSHING | DIES |
|---|---|---|---|---|
| LONG PIPE | SAME | SAME | IN | SAME |
| SHORT PIPE | SAME | REVERSED | IN | SAME |
| VERY SHORT | SAME | SAME | OUT | SAME |
| CLOSE NIPPLE | SAME | REVERSED | OUT | SAME |
FIG. 4
CLINTON S. FINCH
INVENTOR.
BY
*Clinton S. Blodgett*

3,344,451
THREADING TOOL
Clinton S. Finch, Marlow, N.H. 03456
Filed Aug. 2, 1965, Ser. No. 476,600
4 Claims. (Cl. 10—111)

This invention relates to a threading tool and, more particularly, to apparatus arranged to facilitate the cutting of threads on pipe and the like.

It is quite often necessary in plumbing or electrical conduit work to prepare close nipples on the job. In the past, this has been accomplished by first threading one end of a length of pipe, cutting off a nipple-length from this threaded end of the pipe, chucking the threaded end of the short length in a vise, and then threading the free end by holding the threading die holder in general alignment while forming a thread. Since there was no way of guiding the heavy die holder, the thread thus formed was very often misaligned and cut inaccurately. A similar problem arises very frequently when forming a thread on a pipe which extends only a short distance from a wall; there is insufficient length of pipe to guide the threading die holder, and it has been the usual practice to attempt the cutting of such threads by reversing the die in the die holder, supporting the die holder by hand, and then attempting to retain it in alignment with the pipe while cutting the thread. An inaccurate thread cut in this way results in considerable wasted time in the succeeding operations making use of such threaded pipe or nipple. These and other objects of the present invention have been obviated in a novel manner by the present invention.

It is, therefore, an outstanding object of the invention to provide a threading tool to facilitate the guiding of a threading die holder during the cutting of threads on close nipples and short lengths of pipe.

Another object of this invention is the provision of a threading tool for holding a close nipple and the like firmly without damage to the threads nor deformation of the cross-sectional shape.

A further object of the instant invention is the provision of a threading tool permitting the accurate alignment of a threading die holder with a short length of pipe protruding from a wall or the like.

A still further object of the invention is the provision of a tool for facilitating the threading of pipe, which tool is inexpensive to manufacture, which is rugged and simple to use, and which will permit a plumber or electrician to work much faster.

To the accomplishment of the foregoing and related ends, the invention, then, comprises the features hereinafter fully described and particularly pointed out in the claims, the following description and the annexed drawings setting forth in detail a certain illustrative embodiment of the invention, these being indicative, however, of but one of the various ways in which the principle of the invention may be employed.

In said annexed drawings:

FIG. 1 is an elevational view with certain parts in section of a threading tool embodying the principles of the invention, FIG. 2 is a somewhat schematic view of the invention as used to thread a short length of pipe, FIGS. 3 and 3A show somewhat schematically the apparatus while threading a close nipple, FIG. 4 is a chart showing the relationship of the parts during various uses, and FIG. 5 is a somewhat schematic view of the invention as used to thread a short length of pipe protruding from a wall.

Referring first to FIG. 3, wherein are best shown the general features of the invention, the threading tool, indicated generally by the reference numeral 10, is shown as it would be used to complete a close nipple. The tool consists of a mandrel 12 and a sleeve 13 used with a tubular bushing 14. The mandrel is formed with a portion 15 of large diameter and a portion 16 of small diameter. A portion 17 of the large portion 15 is provided with pipe threads extending for a distance equal to the length of a standard pipe thread and has mounted thereon the sleeve 13. The sleeve 13 is provided with internal threads which exactly match the threads on the part 17 of the mandrel and extend for a distance equal to twice the length of a standard pipe thread. The sleeve is threaded onto the mandrel in a very tight manner, resulting in a firm union between the two. The small portion 16 of the mandrel has a diameter only slightly less than the inside diameter of a pipe or nipple, so that a sliding fit exists between the two. When the sleeve 13 is tightly threaded on the mandrel, a portion of its internal threads remain exposed; this portion is formed with a pipe thread which is standard length and taper, so that, when a nipple is tightly threaded in the sleeve, its inner end presses tightly against the shoulder forming the end of the large portion 15 of the mandrel. Outwardly of the threads, the sleeve 13 is provided with a counterbore 20. The bushing 14 is similar to a short length of pipe of the same size as the pipe from which the nipple is made and is provided at one end with a radial flange.

The operation of the apparatus will now be readily understood in view of the above description. When it is desired to thread the end of a long piece of pipe, one end of the pipe is, of course, threaded while it still remains a part of the main body of pipe. Then, the pipe is cut to length and it is desired to thread the other end. At that time, the pipe is placed on the mandrel in the manner shown in FIG. 2 and the enlarged portion 15 is held in a vise 18, the pipe 11 being threaded into the outer threads of the sleeve 13 (which has its recess 20 facing outwardly and surrounding the pipe 11). With such a long pipe the direction that the recess 20 faces is immaterial. In accordance with the chart in FIG. 4 it can be seen that for such a long pipe (and by "long pipe" is meant one that is too short to put in a vise to thread in the usual way but is considerably longer than a so-called "nipple") the mandrel remains in the position shown in FIG. 1, as does the sleeve 13, the bushing 14 (in place in the threading die holder 19), and the dies 21. The dies are mounted in the die holder so that the tapering of the threads is such that the narrow end of the taper is to the right in FIG. 1. The inside diameter of the bushing 14, of course, fits smoothly on the outside diameter of the pipe 11 and guides the dies onto the end of the pipe squarely, as is evident in FIG. 2.

When the pipe is a short pipe, that is to say, so short that, if one attempted to use the method shown in FIG. 2, the bushing 14 would hit against the end of the sleeve 13 and prevent the thread from being finished, the method to be used is to keep the mandrel the same, reverse the sleeve 13, leave the bushing in and keep the dies 21 the same. In other words, only the sleeve 13 is reversed or changed. The piece of pipe is already threaded at one end because this was done while it was still part of the parent pipe. The threaded end of the pipe is threaded into the sleeve 13 but, of course, the recess 20 extends to the left. This holds the short piece of pipe and the large portion 15 of the mandrel is placed in a vise in a manner similar to FIG. 2, so that the pipe can then be threaded in the ordinary way with the bushing 14 in place as shown in FIG. 2. Reversing the sleeve 13 in this way gives more room for the die holder 19 to advance onto the pipe and greater opportunity for the dies 21 to engage a sufficient length of the pipe to form the standard pipe thread.

For a very short pipe or long nipple (where, if the procedure used for a so-called "short pipe" was used, the end of the sleeve 13 would strike the bushing 14 before the thread was completed, even though it was reversed) a slightly different procedure is used. At that time, the mandrel remains the same and so do the dies and the sleeve 13, but the bushing 14 is removed. Then, the dies are guided onto the pipe by the sliding of the exterior surface of the sleeve 13 on the bore in the die holder 19 normally occupied by the bushing 14.

For a very, very short pipe, that is, the so-called "close nipple," which is about twice the standard thread length, the procedure shown in FIG. 3 is used, the mandrel and the dies remain the same, but the sleeve 13 is reversed from the condition shown in FIG. 1. The bushing 14 is, of course, removed. The pipe is still guided by the small part of the mandrel. The die holder 19 is guided by the outer surface of the sleeve 13 which mates with the bore in the die holder, as shown in FIG. 3A. This permits threading right up to the point where the end of the sleeve 13 strikes the inboard ends of the thread cutters.

In threading short projecting pipes, the method shown in FIG. 5 is used. The dies 21 are reversed in their holders so that the taper lies with the large end facing downwardly toward the protruding pipe 11. The sleeve 13 is removed but the bushing 14 remains in place. Then, the mandrel 12 is used as a guide to present the die holder squarely to the pipe 11 and threading takes place. As a matter of fact, it is possible to recess the concrete or material around the end of the pipe to permit the thread to go even below the normal level of the material.

Other modes of applying the principles of the present invention may be employed, change being made as regards the details described provided the features stated in the following claims are the equivalent of such be employed.

Invention having been thus described, what is claimed as new and desired to secure by Letters Patent is:

1. A threading tool for use with pipe and a pipe-threading die holder, comprising an integral mandrel having a large portion and a small portion, the small portion having a diameter slightly less than the internal diameter of the said pipe, the large portion being formed with threads in the part adjacent the small portion, an internally-threaded sleeve mounted on the threaded part of the large portion and extending over the small portion for a considerable distance, the portion of the internal surface of the sleeve which overlies the small portion of the mandrel having a thread which is standard for pipe of the size with which the tool is to be used, the portion of the sleeve overlying the small portion of the mandrel being of the length normally threaded on pipe of the said size so that threaded pipe passed over the small portion of the mandrel and threaded into the sleeve will firmly contact the end of the large portion, and a bushing adapted to fit in a bore in the die holder, the internal diameter of the bushing being equal to the outer diameter of the pipe, the outer diameter of the bushing being equal to the outer diameter of the said sleeve.

2. A threading tool as recited in claim 1, wherein the threads on the mandrel extend for a distance equal to the length of a standard pipe thread in the size of pipe in question.

3. A threading tool as recited in claim 1, wherein the internal threads on the sleeve extend for a distance equal to twice the length of a standard pipe thread in the size of pipe in question.

4. A threading tool as recited in claim 1, wherein the sleeve is provided at one end with a substantial counterbore of a diameter greater than the root diameter of the sleeve threads.

References Cited
UNITED STATES PATENTS

| 344,714 | 6/1886 | Dowden et al. | 10—111 |
| 3,255,473 | 6/1966 | Bellaire et al. | 10—1 |

HARRISON L. HINSON, *Primary Examiner.*